(12) United States Patent
Sadolfo et al.

(10) Patent No.: US 11,462,092 B2
(45) Date of Patent: Oct. 4, 2022

(54) SAFETY SYSTEM TO PREVENT THE ABANDONMENT OF A CHILD IN A MOTOR VEHICLE

(71) Applicant: FILO S.R.L., Rome (IT)

(72) Inventors: Giorgio Sadolfo, Rome (IT); Davide Guglielmo, Rome (IT); Gianluca Granero, Rome (IT); Vincenzo Roselli, Rome (IT)

(73) Assignee: FILO S.R.L., Rome (IT)

( * ) Notice: Subject to any disclaimer, the term of this patent is extended or adjusted under 35 U.S.C. 154(b) by 0 days.

(21) Appl. No.: 17/311,920

(22) PCT Filed: Nov. 29, 2019

(86) PCT No.: PCT/IB2019/060313
§ 371 (c)(1),
(2) Date: Jun. 8, 2021

(87) PCT Pub. No.: WO2020/121106
PCT Pub. Date: Jun. 18, 2020

(65) Prior Publication Data
US 2022/0028238 A1   Jan. 27, 2022

(30) Foreign Application Priority Data

Dec. 12, 2018   (IT) .................. 102018000011010
Feb. 25, 2019   (IT) .................. 102019000002631

(51) Int. Cl.
*G08B 21/02*        (2006.01)
*G08B 21/22*        (2006.01)
(Continued)

(52) U.S. Cl.
CPC ...... *G08B 21/025* (2013.01); *B60R 21/01556* (2014.10); *G08B 21/22* (2013.01); *G08B 21/24* (2013.01)

(58) Field of Classification Search
CPC ...... G08B 21/025; G08B 21/24; G08B 21/22; G08B 21/02; G08B 21/0205; G08B 21/0266; B60R 21/01516; B60R 21/01556
See application file for complete search history.

(56) References Cited

U.S. PATENT DOCUMENTS 9,424,728 B2 *  8/2016  Rambadt ................ G08B 21/24
10,917,771 B2 *  2/2021  Orris ...................... E05F 15/77
(Continued)

FOREIGN PATENT DOCUMENTS

EP        1698870 A1    9/2006
IT     UB20154129 A1    4/2017
(Continued)

OTHER PUBLICATIONS

International Search Report for International Patent Application No. PCT/IB2019/060313, dated Jan. 17, 2020.

*Primary Examiner* — John A Tweel, Jr.
(74) *Attorney, Agent, or Firm* — Armstrong Teasdale LLP (57) ABSTRACT

A safety system for preventing child abandonment in a motor vehicle is provided. The safety system includes a device installable on a child safety seat, a safety belt, or a seat belt shoulder strap. The device includes a presence sensor configured to detect child safety seat occupancy, and a radio transmitter configured to emit a radio signal within a predefined transmission range and functionally connected to the presence sensor to receive a child safety seat occupancy signal and insert presence information into the radio signal. The safety system includes warning signal receiving devices configured to detect the radio signal within the predefined transmission range and extract presence information from the radio signal, and warning emission means. The presence sensor is a capacitive sensor. Each warning signal receiving device is configured to trigger the warning (Continued)

emission means after initially extracting presence information and subsequently detecting an interruption of the radio signal.

11 Claims, 5 Drawing Sheets

(51) Int. Cl.
  *G08B 21/24* (2006.01)
  *B60R 21/015* (2006.01)

(56) References Cited

U.S. PATENT DOCUMENTS

| | | | |
|---|---|---|---|
| 2001/0020714 A1 | 9/2001 | Kraetzl et al. | |
| 2003/0098792 A1* | 5/2003 | Edwards | G08B 13/1427 |
| | | | 340/573.1 |
| 2011/0074447 A1 | 3/2011 | Ootaka | |
| 2013/0241578 A1 | 9/2013 | Satake et al. | |
| 2014/0052342 A1* | 2/2014 | Seibert | B60N 2/002 |
| | | | 701/45 |
| 2017/0323549 A1* | 11/2017 | Copulos | G08B 21/24 |
| 2018/0009376 A1 | 1/2018 | Johnson | |
| 2018/0056814 A1 | 3/2018 | Tanyi | |
| 2020/0017066 A1* | 1/2020 | Goru | B60N 2/002 |

FOREIGN PATENT DOCUMENTS

| | | |
|---|---|---|
| WO | 03032270 A1 | 4/2003 |
| WO | 2017086916 A1 | 5/2017 |

* cited by examiner

SAFETY SYSTEM TO PREVENT THE ABANDONMENT OF A CHILD IN A MOTOR VEHICLE

CROSS-REFERENCE TO RELATED APPLICATIONS

This application is a National Stage Application of International Patent Application No. PCT/IB2019/060313, having an International Filing Date of Nov. 29, 2019, which claims the benefit of priority to Italian Patent Application No. 102018000011010, filed Dec. 12, 2018, and Italian Patent Application No. 102019000002631, filed Feb. 25, 2019, the entire contents of each of which are hereby incorporated by reference herein.

FIELD OF THE INVENTION

The present invention concerns a safety system to prevent the abandonment of a child in a motor vehicle.

BACKGROUND OF THE INVENTION

As is known, the number of children who have died from hyperthermia because they have been forgotten in vehicles is not low and it is a shared feeling that even a single case is unacceptable.

In the guidebook published by the Ministry of Health to prevent the cases of children forgotten in vehicles, one finds that in the United States on average 36 children die each year from hyperthermia because of being left alone in the car by their parents, "for a total of 468 deaths in the last 12 years". In France, the Consumer Safety Commission has also estimated that between 2007 and 2009, there were 24 cases. For further information, please consult the website of the Italian Ministry of Health www.salute.gov.it.

There are many causes for the parents' distraction, which cause the tragedy of forgotten children: tension, stress related to the pressing engagement of work and numerous daily commitments, which consume the attention of the parent and divert it to other subjects or activities, but we should not overlook a possible malfunction of attention itself, independent of the commitment of the same parents.

Research in this regard has highlighted the fact that vigilant attention often feeds on routine gestures, whereby the internal alarm is triggered in the event of non-compliance, but these routine (and therefore memorized) gestures, if compressed into many commitments, even for the same children, may be altered in the memory. In a situation of intense stress, our brain mechanism, with a view to optimizing the use of resources, may form incomplete memories or even lead us to remember episodes that have never occurred, such as, for example, having accompanied the child to daycare or to the babysitter.

There is no need to explain here the tragedy represented by the fatal events that may result—and in some cases do result—from such mnemonic malfunctions, also because they often happen to parents engaged on several fronts in providing all the best opportunities to their children.

There is also no need to dwell on the fact that the social objective is to eliminate the occurrence of such tragic events, or at least to make them extremely infrequent.

Various technological solutions to the aforesaid problem are known, with altogether variable effectiveness. The use of the parents' mobile phone to signal the presence of the child still in the child safety seat is a common element of some of these solutions. In this case, presence sensors (weight) integrated into the child safety seats are used.

However, these solutions are not accessible to all economically, and are often unknown, especially in less developed countries and among the less privileged classes. And even in the case of limited adoption, they are inconvenient and not entirely effective, which unfortunately discourages those parents who most underestimate the risk of fatal events.

The need therefore remains for a solution of the type described above that is effective, convenient, economical and easily usable by the population at large, being able to easily comply with the constantly changing rules on child safety seats.

SUMMARY OF THE INVENTION

The object of this invention is to provide a safety system to prevent the abandonment of a child in a motor vehicle, which is easier to manufacture and has greater convenience of use.

A further object of the invention is that said safety system may be manufactured with substantially moderate costs, both in terms of production costs and in terms of management costs.

Not least, the object of the invention is to propose a signaling system that is simple, safe and reliable.

The subject of the present invention is a system according to the accompanying claims, which form an integral part of the present description.

BRIEF DESCRIPTION OF THE DRAWINGS

The invention will now be described for illustrative but non-restrictive purposes, with particular reference to the drawings of the accompanying figures, wherein.

It is specified here that elements of embodiments may be combined together to provide additional embodiments without restrictions respecting the concepts of the invention, as the person skilled in the art understands without difficulty by that which is described.

The present description also refers to the prior art for the implementation thereof, with respect to undescribed detailed features, such as elements of minor importance usually used in the prior art in solutions of the same type.

When an element is introduced it is always intended to mean "at least one" or "one or more".

When listing elements or features in this description, it is understood that the invention "comprises" or alternatively "is composed of" such elements.

DETAILED DESCRIPTION

Figure 1:
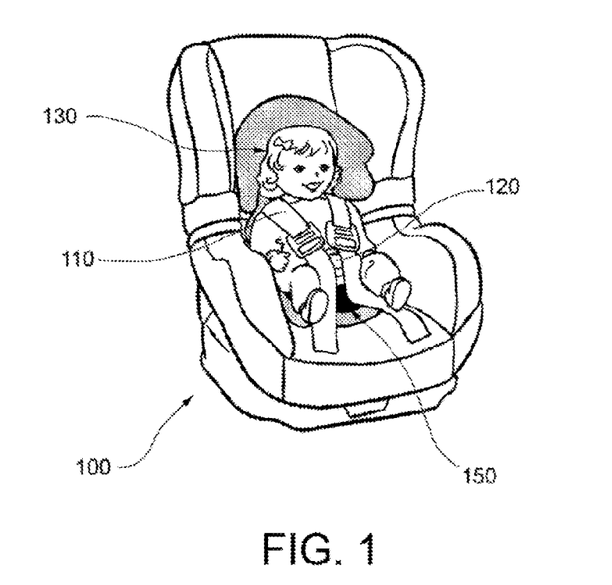
FIG. 1 shows a child safety seat for a motor vehicle wherein a child is represented sitting on a device for detection and communication of presence according to an embodiment, in the form of a cushion.

Referring to FIG. 1, the device 150 according to the invention is preferably to be used resting on the seat part of a child safety seat 100 for a vehicle. Technically, it may also be used on the seat of a vehicle or on any other seat surface. It may be fixed, but more generally is "installed", i.e., in some way attached to the child safety seat or other seat, or even to the belt or shoulder strap of a vehicle seat (see below for this embodiment).

Although FIG. 1 shows a child safety seat with a backrest, it is understood that the device according to the invention may be used with any child safety seat or other seat that has a seat part, therefore also with standard booster seats without a backrest.

In the case of a child safety seat 100 with backrest, there will be dedicated straps 110 that descend from above and usually couple to a single safety element 120 blocking the movements of the child's torso 130.

Figure 2:
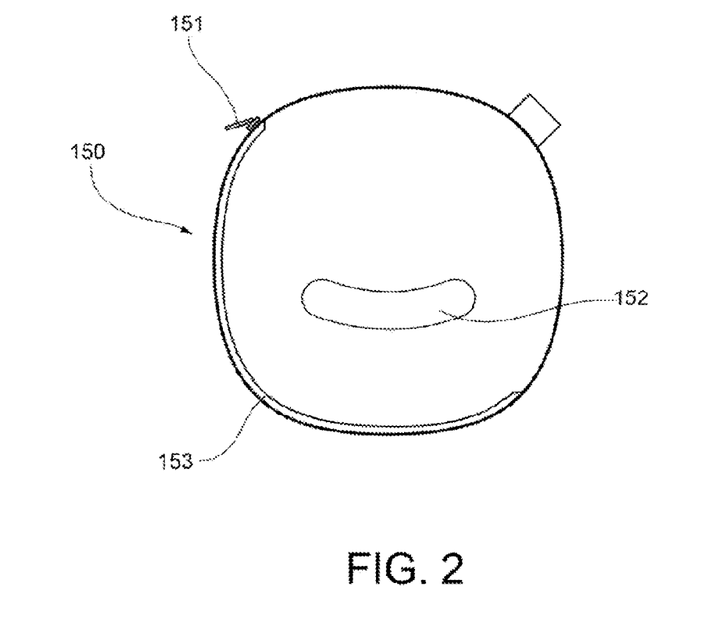
FIG. 2 shows an example of a possible outer shape of the cushion in FIG. 1.

Referring to FIG. 2, a possible embodiment of the shape of the device according to the invention is provided. It is in the form of a cushion 150 with removable cover along one or more sides via a zipper 151, 153. In an inner area of the cushion, a hole 152 is advantageously made appropriately shaped to be able to insert the safety element 120 mentioned above. If this safety element is not present, this shaped hole will not be necessary (although it may still be maintained for different reasons, for example for aesthetic reasons).

Although the representation of FIG. 2 illustrates a cushion that has a certain thickness and, in use, is comprised in the seating area of a child safety seat, this description also includes a cushion or device that, in addition to occupying part of the seat, also occupies other portions of the surface of the child safety seat, for example as an elastic cover of the entire child safety seat.

This allows the device according to the invention to be used retrofitted to existing child safety seats, making a device with such a high social impact accessible to all. Moreover, it allows one not to have to change the production process of child safety seats, avoiding excessive investment by companies in the sector, and making the device even more widespread and inexpensive.

Figure 3:
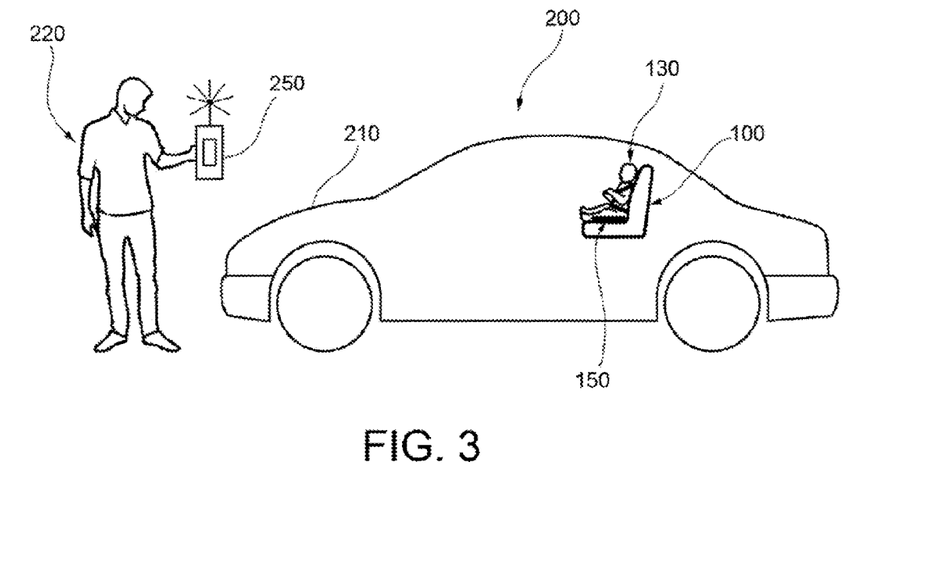
FIG. 3 shows an example of a safety system according to the invention, wherein the device according to the invention is used.

Referring to FIG. 3, the safety system 200 according to one of the embodiments of the present invention is installed on a vehicle 210, with the child safety seat 100 fixed to a rear seat (but it could also be a front seat according to the regulations in force). The child 130 is seated on the device 150 according to the invention, the parent 220 is in possession of the mobile phone 250 which is ready to launch a warning in the ways provided, for example as shown below.

Figure 4:
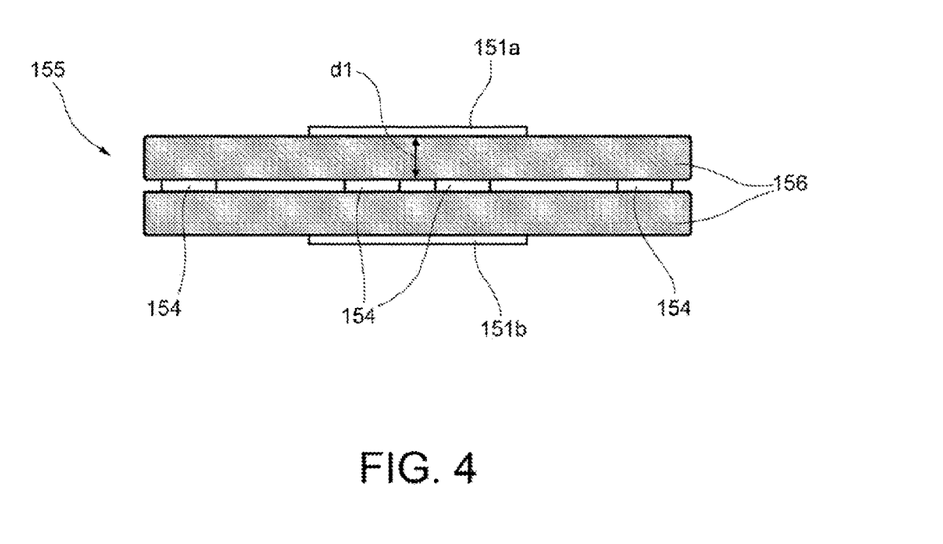
FIG. 4 shows a possible and preferred presence sensor structure according to an embodiment of the present description, in a state of inactivity.
Figure 5:
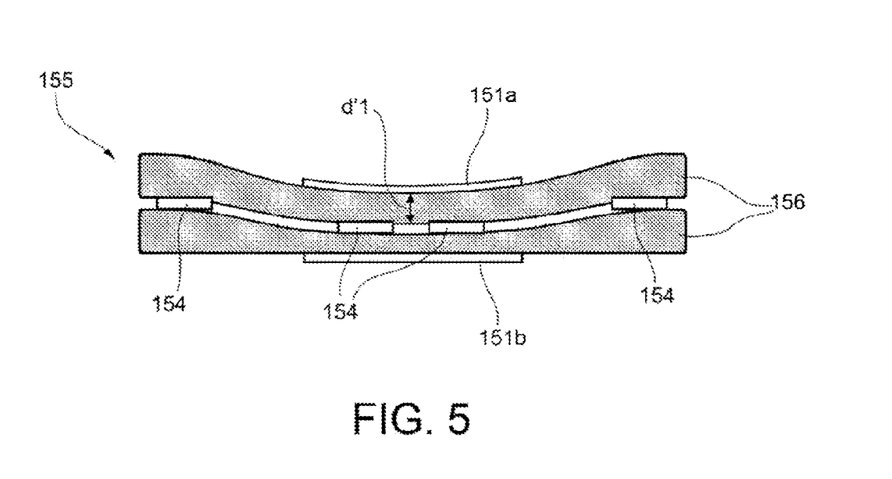
FIG. 5 shows the sensor structure according to FIG. 4, in a position wherein there is a body thereon.
Figure 6:
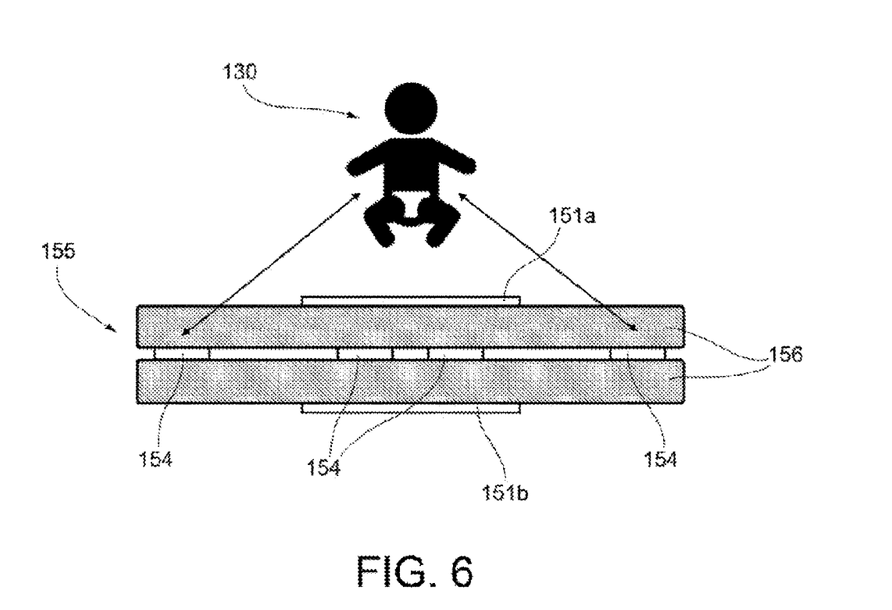
FIG. 6 shows schematically that the sensor structure of FIGS. 4 and 5 is suitable to function as soon as the child is brought close to the child safety seat to be seated therein.

Referring now to FIGS. 4-6, the device 150 according to the invention preferably uses a capacitive sensor 155, but may also use a weight sensor or other type of presence sensor in combination with the capacitive sensor. In any event, using a capacitive sensor makes the device particularly effective in preventing false positives, since not just any body with a certain weight will be detected, but rather a static human body or one that is approaching (or moving away), when the sensor has an appropriate calibration.

In effect, the capacitive sensor bases its operation on that of the electric capacitor which describes how the electric charges are arranged on two conductive bodies placed at a certain distance from each other. In this case, when the child approaches (or moves away), even before contact (see FIG. 6), a capacitance change occurs and therefore there is a presence detection signal.

In addition to the capacitance meter, a deformation sensor may optionally be used in combination. Advantageously, it is still a capacitive sensor (with elastically deformable elements) that is in reality activated by a deformation and therefore in effect is a deformation sensor. This combination is a particularly expedient embodiment as it still uses capacitance for two very different and complementary measurements, greatly increasing the reliability of the overall presence sensor.

In this case, the arrangement of the detection capacitors, beyond the field of application, contributes to the invention of the system.

The presence sensor 155 comprises a first capacitor plate 151a and a second capacitor plate 154, between which is placed a soft and/or flexible material 156, wherein the first 151a and the second 154 plate have a mutual distance equal to $d_1 > 0$ when the child safety seat 100 is not occupied, while they have a distance of $d'_1$ with $0 < d'_1 < d_1$ when the child safety seat 100 is occupied, or the child 130 is sitting thereon.

Advantageously, according to the invention, the second capacitor plate 154 consists of several portions, also not connected directly, at least one portion having a normal projection within the area of said first plate 151a and at least one different portion having a normal projection outside of the area of said first plate 151a. With this arrangement, the portions outside the area of the first plate are not significantly concerned by the deformation and may better serve as a capacitive sensor.

Advantageously, in an embodiment, a third plate 151b is arranged frontally to said first plate 151a, so that, in the absence of a deformation signal, said second plate 154 is equidistant from said first plate 151a and said third plate 151b, a soft and/or flexible material 156 also being placed between said second plate 154 and said third plate 151b.

Advantageously, the soft and/or flexible material 156 is a sponge-like material.

The presence sensor 155 will, of course, comprise or be connected to power means, known per se.

FIG. 5 shows how the structure 155 deforms under the weight of a child, passing from the central distance $d_1$ to the reduced central distance $d'_1$, which changes the capacitance of the system. This sensor thus acts as a deformation sensor, which simulates a weight sensor.

The merging of the information coming from the two sensors (deformation and pure capacitive) allows the presence of the child's body to be detected more accurately than in the prior art.

According to an embodiment of the invention, the sensor 155 may also comprise the first plate 151a and the second plate 154, without the third plate 151b and the foam between the second and the third plates. Optionally, also the second plate 154 may also be absent, because the human body acts as the second plate.

In general, the presence sensor 155 and the radio transmitter 157 are comprised in a casing that constitutes at least partially a cushion or a mattress or mat or a seat cover that is removable from the vehicle child safety seat 100.

Figure 8:
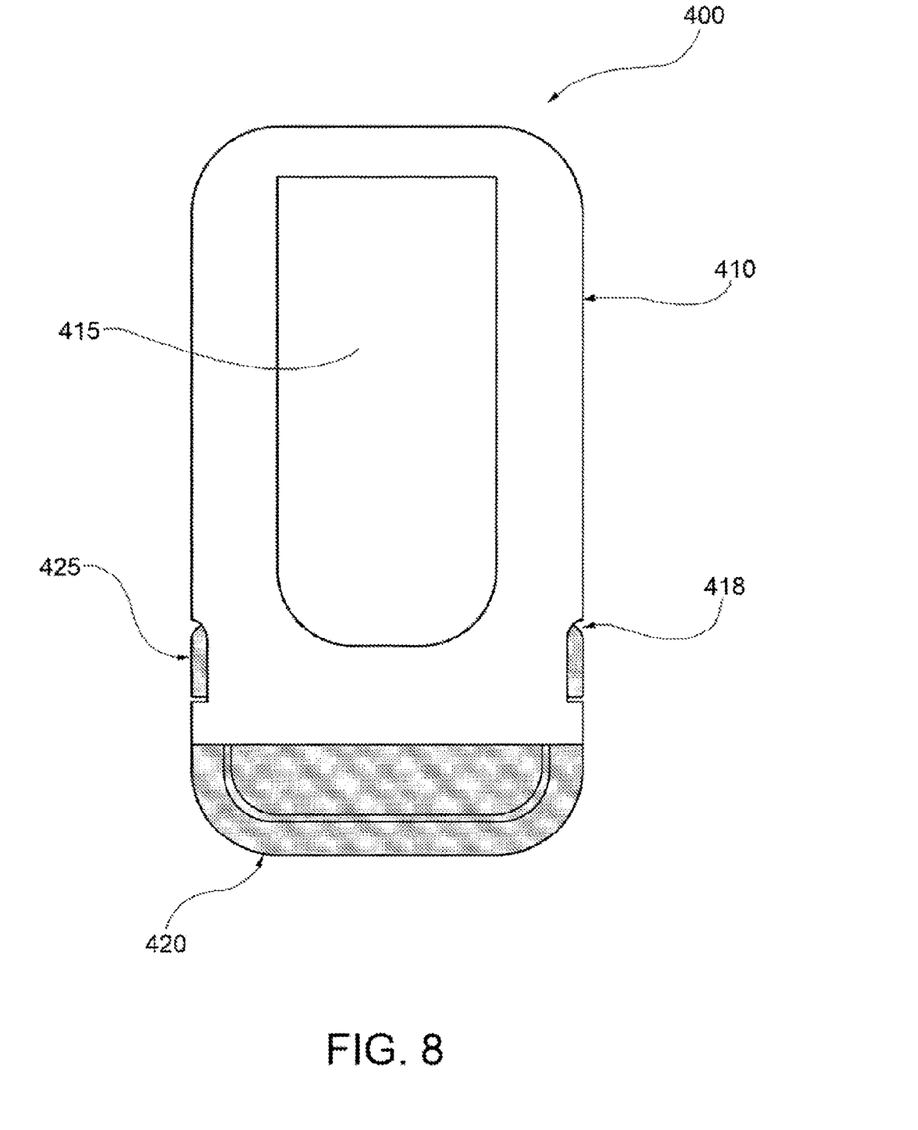
FIG. 8 shows a different embodiment of the device for detection and communication of presence according to the invention.

According to an alternative embodiment of the present invention, and referring to FIG. 8, the presence sensor 155 and the radio transmitter are comprised in a clip that may be attached either to the seat belt or to a shoulder strap associated with a vehicle seat. An illustrative embodiment of the clip is indicated as a whole at 400. The clip 400 has a body 410 with an elastic tab 415. Advantageously, the clip 400 also comprises a second body 420, which is engaged from below by slipping into the first body 410. The first body 410 has two lateral openings 418 into which two lateral fins 425 of the second body 420 are snapped. In this way, one may easily access the sensor and transmitter that are housed in the second body 420. Further designs of the clip 400, e.g. as a single piece, are also possible.

Figure 7:
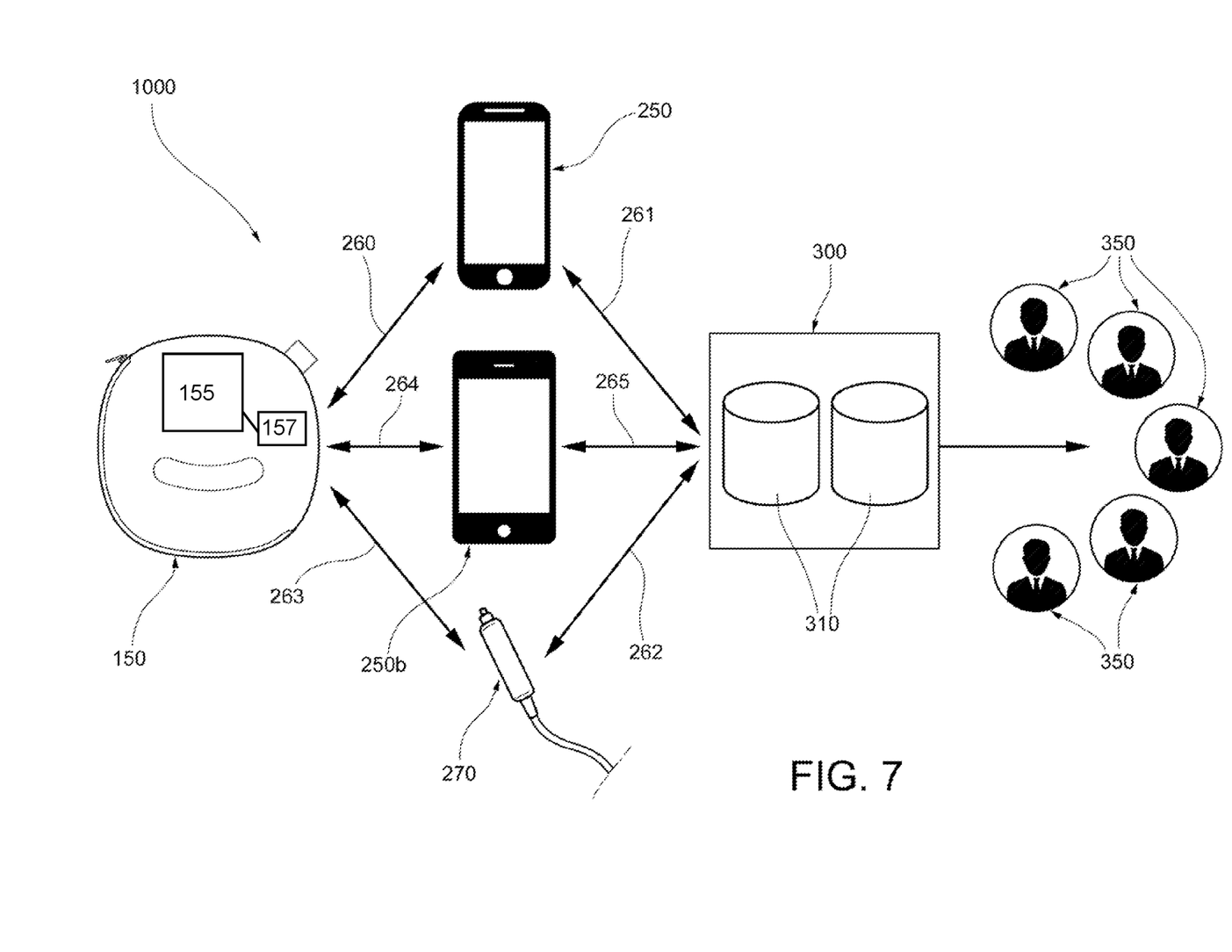
FIG. 7 shows a mixed block/flow diagram of an embodiment of the safety system according to the invention.

FIG. 7 shows in greater detail the operation of the safety system according to the invention. The cushion 150 is remotely connected (e.g. via Bluetooth) 260, 264 with one or more smartphones (in general, mobile devices, preferably via the appropriate app) 250, 250b or in physical connection 263 with a different hardware 270 (represented by a Bluetooth device in the form of a connector for the cigarette lighter, or even an ODB Dongle with Bluetooth or a vehicle black box). In general, one will speak of warning receiving devices.

The presence sensor 155 detects the presence of the child and through a radio transmitter sends this information to the hardware (one or more) 250, 250b, 270, which extract this information and emit a warning when:

They have initially extracted said presence information; and
They have subsequently detected an interruption of said radio signal.

These two conditions are indicative of a danger of forgetting the child in the car. Different conditions indicative of the danger are also comprised in the present invention.

All the hardware external to the cushion 150 may be in communication 261, 262, 265 with a central data processing unit 300 containing preferably one or more databases 310, and able to warn third parties 350 of the presence of the child in the vehicle when the parents have left without responding to the direct warning (even one of the parents or guardians, the warning being issued by warning emission means), i.e.:

at least one of said one or more associated warning signal receiving devices 250, 250b, 270 has launched the warning;
each of said one or more associated warning receiving devices 250, 250b, 270 is outside of a predefined transmission range of said presence information after a predefined time interval from said activation of said warning emission means.

Alternatively, the warning management server 300 is configured to send a warning signal to the third-party device 350 if the following two conditions are met:

The warning management server 300 has received said presence information from one of the one or more associated warning receiving devices 250, 250b, 270;
The communication between the warning management server 300 and at least one of the one or more associated warning receiving devices 250, 250b, 270 has been cut off within a predefined time interval.

The warning receiving devices 250, 250b, 270 may be configured and used to communicate the respective GPS position to the warning management server 300, for cross-checking or an independent calculation of the distance from the child safety seat. The server 300, on this basis, may autonomously warn third parties 350.

The warnings may be differentiated to warn of both the unattended presence of the child and of any malfunctioning of the system.

The warnings may be: a call, a text message, a visual signal, a sound signal, or a combination thereof. It is also possible to view a photo of the child through a camera installed in the vehicle. In general, the warnings will be emitted by warning emission means, such as a buzzer, screen, vibrator, etc.

Optionally, if the presence sensor detects the child's presence but experiences a lack of connection to a mobile phone, it may emit a sound to warn parents or guardians that their mobile phones are disconnected and that the child is in position. Likewise, it may send a lack-of-connection signal to a server.

Advantages of the Invention

With the device according to the invention, the use of alarms for the presence of a child in a child safety seat becomes accessible, convenient to use in retrofit and more effective.

In the case of a deformable capacitive sensor, the double functionality of capacitance and deformation detection through capacitors allows an extension of the normal operations of a capacitive sensor, and a higher reliability (fewer false positives) of the presence sensor and therefore of the device.

In the foregoing, the preferred embodiments have been described and variants of the present invention have been suggested, but it is intended that the persons skilled in the art will be able to make modifications and changes without departing from the relative scope of protection, as defined by the accompanying claims.

The invention claimed is:

1. A safety system for preventing child abandonment in a motor vehicle, the safety system comprising:
a device installable on a vehicle child safety seat, a seat belt or a seat belt shoulder strap, the device comprising:
a presence sensor configured to detect if the vehicle child safety seat is occupied;
a radio transmitter:
configured to emit a radio signal within a predefined transmission range;
functionally connected to the presence sensor to receive from the presence sensor a signal that the vehicle child safety seat is occupied and to insert presence information in said radio signal; and
one or more warning signal receiving devices:
configured and adapted to detect said radio signal within said predefined transmission range;
configured to extract said presence information from said radio signal; and
comprising warning emission means;
wherein:
the presence sensor is a capacitive sensor;
each of said one or more warning signal receiving devices is configured to activate said warning emission means after:
initially extracting said presence information; and
subsequently detecting an interruption of said radio signal;
wherein:
said device comprises a hole configured for through passage of a safety element of the vehicle child safety seat;
said one or more warning signal receiving devices are configured and adapted to communicate with a warning management server;
said warning management server is configured to send a warning signal to at least a third device in the event that the following two conditions occur:

the warning management server has received said presence information from one of said one or more warning signal receiving devices; and communication between the warning management server and at least one of said one or more warning signal receiving devices has been cut off within at least one predefined time interval.

2. The safety system according to claim 1, wherein the device is a casing at least partially forming one among a cushion, a mattress, a mat or seat cover, removable from the vehicle child safety seat.

3. The safety system according to claim 1, wherein the presence sensor comprises a capacitive sensor and/or a deformation sensor, the presence information being created when an appropriate detection signal is generated from the capacitive sensor and/or from the deformation sensor, respectively.

4. The safety system according to claim 3, wherein said deformation sensor is obtained by one or more elastically deformable capacitors.

5. The safety system according to claim 4, wherein the presence sensor comprises a first capacitor plate and a second capacitor plate, a soft and/or flexible material being placed between the first capacitor plate and the second capacitor plate, wherein the first and second capacitor plates have a mutual distance equal to $d_1>0$ when the vehicle child safety seat is not occupied and a distance of $d'_1$ with $0<d'_1<d_1$ when the vehicle child safety seat is occupied.

6. The safety system according to claim 5, wherein said second capacitor plate consists of several portions, at least one portion having a normal projection within an area of said first capacitor plate and at least one different portion having a normal projection outside the area of said first capacitor plate.

7. The safety system according to claim 5, further comprising a third capacitor plate arranged frontally with respect to said first capacitor plate, so that, in the absence of a deformation signal, said second capacitor plate is equidistant from said first and third capacitor plates, a soft and/or flexible material being placed between said second and third capacitor plates.

8. The safety system according to claim 5, wherein said soft and/or flexible material is a sponge-like material.

9. The safety system according to claim 1, wherein said one or more warning signal receiving devices are configured and adapted to communicate a respective GPS position to said warning management server.

10. The safety system according to claim 1, wherein said warning management server is configured to send the warning signal to at least the third device in the event that the following two additional conditions also occur:

at least one of said one or more warning signal receiving devices has activated said warning emission means; and each of said one or more warning signal receiving devices is outside of said predefined transmission range after a predefined time interval from activation of said warning emission means.

11. The safety system according to claim 1, wherein said device is a clip fastenable to the seat belt or to the seat belt shoulder strap.

* * * * *